United States Patent [19]
Padula

[11] 3,972,505
[45] Aug. 3, 1976

[54] CONTROL VALVE

[75] Inventor: Lawrence D. Padula, New Britain, Conn.

[73] Assignee: Skinner Precision Industries, Inc., New Britain, Conn.

[22] Filed: Apr. 4, 1975

[21] Appl. No.: 565,278

[52] U.S. Cl............... 251/129; 137/625.65; 339/103 R; 335/278
[51] Int. Cl.²................................ F16K 31/06
[58] Field of Search............ 251/129; 137/625.65, 137/625.64; 339/103 R, 103 M; 335/260, 278

[56] References Cited
UNITED STATES PATENTS

| | | | |
|---|---|---|---|
| 2,914,034 | 11/1959 | Becker | 137/625.65 |
| 3,327,264 | 6/1967 | Rodaway | 251/129 X |
| 3,462,116 | 8/1969 | Wright, Jr. | 335/278 |
| 3,529,620 | 9/1970 | Leiber | 251/129 X |
| 3,726,315 | 4/1973 | Sheppard | 137/625.65 |

FOREIGN PATENTS OR APPLICATIONS 2,213,973 10/1972 Germany .................... 251/129

*Primary Examiner*—Arnold Rosenthal
*Attorney, Agent, or Firm*—Prutzman, Hayes, Kalb & Chilton

[57] ABSTRACT

An all ports in body, solenoid operated valve assembly includes a valve body and a valve operator mounted on the body with an electromagnetic core featuring a center leg projecting axially beyond the solenoid coil. A plunger and seal assembly is mounted for reciprocation along a path of movement aligned with the core center leg. The plunger and seal assembly is remotely located from the coil and all flow passages are formed in the assembly such that fluid flow through the center of the coil is excluded to minimize heat transfer to the confined fluid being controlled when the valve is electrically energized and to prolong the orifice seal life of the assembly.

7 Claims, 6 Drawing Figures

U.S. Patent   Aug. 3, 1976   3,972,505
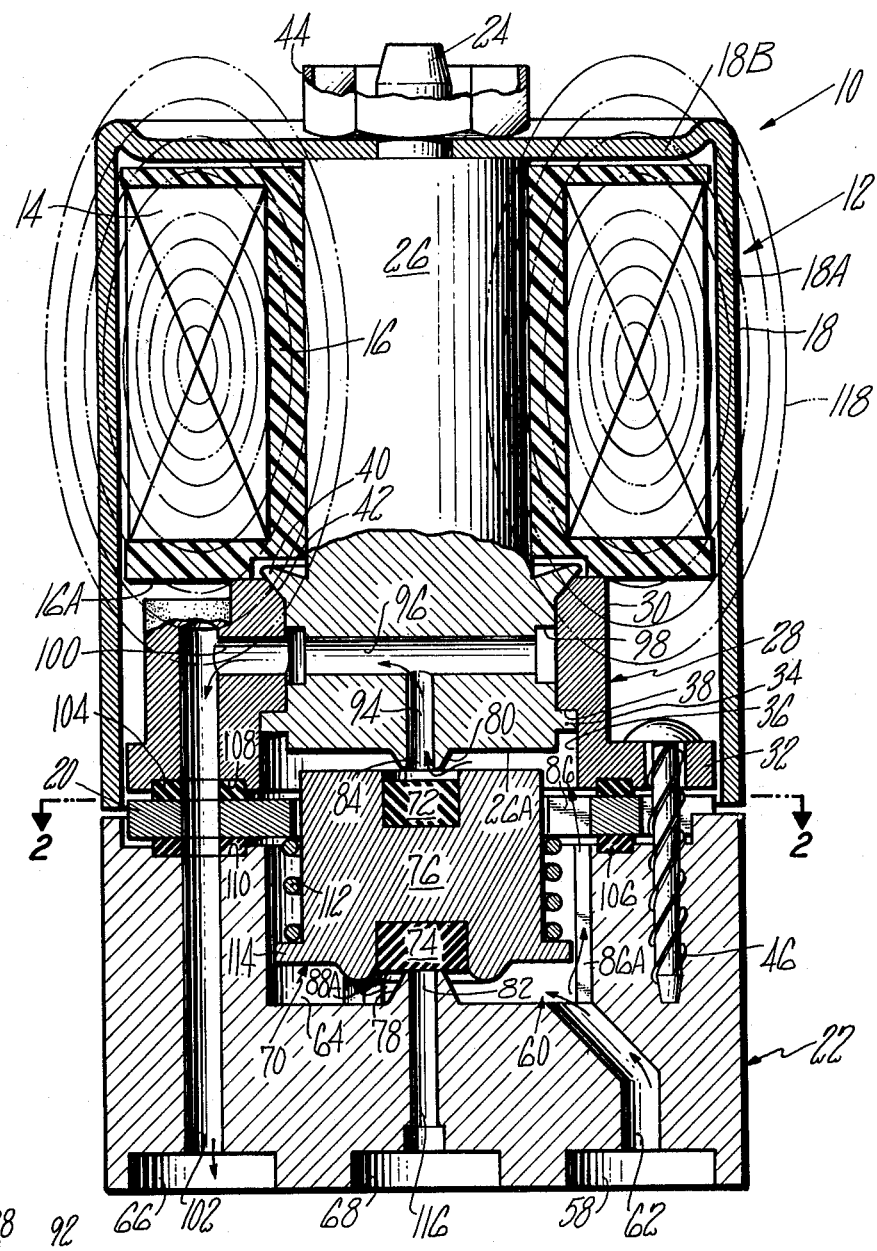

CONTROL VALVE

This invention generally relates to fluid control valves and particularly concerns an improved magnetically operated valve wherein the fluid being controlled is excluded from the region of the valve operator coil.

A primary object of this invention is to provide a new and improved magnetically operated valve having a plunger particularly suited to cooperate with a center leg of the solenoid coil to effect a simplified fluid porting and flow arrangement remotely located relative to the solenoid coil in a construction which is operationally efficient and which may be manufactured at reduced cost. Included in this object is the aim of providing a low cost valve having a fluid porting and flow arrangement which completely eliminates any flow passages which are surrounded by the solenoid coil and thereby reduces heat absorption by the controlled fluid.

Another object of this invention is to provide such a new and improved valve wherein the seals of the plunger are remotely located relative to the solenoid coil to extend the seal life and improve the operation characteristics of the valve assembly.

Still another object of this invention is to provide a new and improved valve wherein all metallic parts are used for confining the fluid being controlled without requiring welded joints or brazed joints to prevent undesired fluid leakage and wherein no flow slots need be formed in the plunger, thereby to further reduce cost while providing improved electromagnetic performance.

A still further object of this invention is to provide a new and improved valve wherein a ferromagnetic circuit arrangement is provided with minimum non-working air gap.

Another object of this invention is to provide a new and improved valve which additionally features a valve solenoid coil bobbin effecting lead wire strain relief and providing lead wire exit protection through a metal housing.

Other objects will be in part obvious and in part pointed out more in detail hereinafter.

A better understanding of this invention will be obtained from the following detailed description and the accompanying drawing of an illustrative application of this invention. In the drawing:

FIG. 1 is a slide view, partly broken away and partly in section, of a preferred embodiment of a valve constructed in accordance with this invention;

FIG. 2 is a reduced sectional view taken along line 2—2 of FIG. 1;

FIG. 3 is a fragmentary view, partly broken away and partly in section, of the valve of FIG. 1 but showing its plunger and seal assembly in a flow control position opposite from that illustrated in FIG. 1;

FIG. 4 is a reduced elevational view, partly broken away, of a solenoid coil bobbin included in this invention;

FIG. 5 is a reduced bottom view, partly broken away, of the bobbin of FIG. 4 shown in relation to a housing; and FIG. 6 is a representation of the magnetic flux pattern that exists when the valve of FIG. 1 is energized.

Referring to the drawing in detail, a fluid control valve assembly 10 is shown incorporating a preferred embodiment of this invention and having a valve operator 12 which includes an electromagnet with a coil 14, desirably insulated in any known manner, wound about a bobbin 16 which may be formed of insulating plastic such as nylon. The operator 12 includes a magnetic flux conducting housing 18 illustrated as having a sidewall 18A formed by a cup-shaped cylinder having a lower open end adjacent an outer edge of a magnetic flux conducting plate 20 supported on a non-magnetic metal valve body 22.

An opposite closed end 18B of the housing 18 has a central opening through which projects a stud 24 of a magnetic flux conducting center leg or post 26 for the coil 14, the housing 18 and center post 26 jointly serving as the electromagnetic core.

The valve operator 12 also includes a coil supporting member or mounting insert 28 of non-magnetic metal having a cylindrical wall 30 and bottom skirt 32. The center post 26 has a bottom flange 34 received within an enlarged diameter section 36 of the insert 28. During assembly, center post 26 is fitted through the bore of the insert 28 to bottom the flange 34 against an internal shoulder 38 within the insert 28, and an intermediate shoulder 40 on the center post 26 is deformed radially outwardly over an upper internal lip 42 of the insert wall 30 into the position shown in FIG. 1 to provide a low cost cold formed metal-to-metal sealed joint which is neither welded nor brazed but effectively prevents fluid leakage between the two metal parts. The coil bobbin 16 seats on the top of the insert wall 30 with the coil 14 surrounding the center post 26, and the housing 18 removably secured in assembly to the coil 14, insert 28 and post 26 by a lock nut 44 releasably engaging the stud 24. To secure the valve operator 12 on the valve body 22, suitable fasteners such as at 46 in FIG. 1 are shown extending through the insert skirt 32 and the flux plate 20 to be anchored in the valve body 22, three such fasteners being shown in FIG. 2 equiangularly spaced apart about the center post 26.

The bobbin 16 has a flange 48 (FIGS. 4 and 5) depending from the outer edge of the bottom wall 16A of the bobbin 16. To provide strain relief for coil lead wires 50, 50 and exit protection for the wires across metal housing 18, a radially projecting boss 52 is integrally formed on flange 48 with an opening 54 extending radially through boss 52 and its supporting flange 48, whereby the lead wires 50, 50 from the solenoid coil 14 may be threaded through the opening 54 to provide the desired strain relief and exit protection features. In addition, the flange itself serves as a self-locating device which projects through a cutout 56 in the bottom of housing sidewall 18A to secure bobbin 16 against undesired movement relative to housing 18, the flange 48 having reinforcing shoulders 48A, 48A laterally extending in opposite directions for engagement with sidewall 18A to resist undesired outward movement of flange 48.

For purposes of this description, the valve assembly 10 is of a type wherein all porting is formed exclusively in the body 22 in a so-called all ports in body construction which is quick and easy to manufacture and assemble with a minimum number of different parts. As best seen in FIG. 1, one fluid flow porting arrangement of the valve assembly 10 is illustrated wherein a port 58 serves as a common port for supplying fluid being controlled to a flow passageway generally designated 60, including passage 62 formed in the valve body 22 leading to valve chamber 64. Valve chamber 64 is shown as being jointly defined by the mounting insert 28, post 26 and valve body 22. Within valve chamber 64 the fluid is alternately directed to a normally open port 66, with the valve assembly 10 de-energized (FIG. 1), and to a normally closed port 68, with the valve assembly 10 energized (FIGS. 3 and 6).

In accordance with one of the features of this invention, the porting and flow passage arrangement is designed to preclude passage of any fluid being controlled into the section of the center post 26 surrounded by the solenoid coil 14 and to additionally dispose plunger and seal assembly 70 in remote relation to the high heat zone of the coil core to ensure extended life of valve members or seals 72, 74.

More specifically, plunger and seal assembly 70 is mounted in valve chamber 64 for reciprocable movement between first and second fluid control positions along an axis of movement coaxially aligned with the center post 26. The center post 26 is designed with its inner end 26A projecting axially beyond coil 14 so as to be remotely spaced apart from the coil 14. The inner end 26A of the center post 26 serves as a fixed stop limiting movement of plunger 76 toward coil 14 and establishes one of the fluid control positions of plunger 76.

Plunger 76 is received in valve chamber 64 for alternately connecting common port 58 with normally open port 66 and normally closed port 68 upon valve members or seals 74 and 72, mounted at opposite axial ends of plunger 76, respectively seating with valve seats 78 and 80 formed in coaxial alignment in the valve body 22 and in the inner end 26A of the center post 26 to define orifices 82 and 84.

As best seen in FIG. 2, three equiangularly spaced flow slots 86, 88 and 90 are formed in flux plate 20 to extend radially outwardly from its central opening 92 to permit fluid flow past plunger 76 and into central orifice 84 in the projecting inner end 26A of center post 26. With plunger 76 in its normally closed position (FIG. 1), fluid flows from valve chamber 64 through flow slots 86A, 88A in valve chamber 64 past plunger 76, through orifice 84 centrally defined by valve seat 80 in inner end 26A of center post 26 and to an axial passage 94 in post 26. Passage 94 communicates with a diametrically extending passage 96 drilled through inner end 26A of post 26 to communicate with an annulus 98 formed between insert 28 and post 26 by a circumferentially extending groove about post 26. Annulus 98 leads to an interior passage 100 formed in insert 28 which leads to a passage 102 extending through insert 28, flux plate 20 and valve body 22 to the normally open port 66. In addition to the metal-to-metal joints described above between insert 28 and center post 26, effective sealing against undesired fluid leakage from valve chamber 64 or passage 102 is provided by a pair of suitable gaskets 104 and 106 which are of identical construction and which are seated within suitable recesses 108 and 110 respectively formed in insert 28 and valve body 22 on opposite sides of flux plate 20.

Upon energizing solenoid coil 14, plunger and seal assembly 70 shifts upwardly under the force of the magnetic flux, causing compression of a return spring 112 which is coiled about plunger 76 and seated between flux plate 20 and a radially extending flange 114 on the lower end of plunger 76. This action opens orifice 82 and connects valve chamber 64 to the normally closed port 68 via passage 116 and moves plunger 76 upwardly such that its seal 72 is in sealing engagement with the opposite valve seat 80 to close orifice 84 to the normally open port 66 (FIG. 3) while solenoid coil 14 remains energized.

Upon de-energizing solenoid coil 14, the compressed return spring 112 urges plunger 76 downwardly to an extent limited by engagement of its seal 74 with valve seat 78 thereby to close the port 68 and to open orifice 84 to the normally open port 66.

By virtue of the above described construction, no need exists for any welding or brazing of the joints to prevent external fluid leakage or leakage between ports while at the same time using all metal parts to confine the controlled fluid. In addition, it will be seen that the fluid being controlled does not flow axially through the coil 14 or through any portion of the center post 26 which extends through the center of the coil 14, thereby substantially reducing heat absorption by the fluid which is being controlled when the solenoid coil 14 is electrically energized. Moreover, with the plunger and seal assembly 70 remotely located below the projecting inner end 26A of center post 26 as shown in remote relation to coil 14, the orifice seal life is significantly extended since seals 72, 74 on both axial ends of plunger 76 are outside the high heat coil core zone as schematically represented by lines 118 depicting the thermal gradient across the coil section. In addition, the disclosed construction has no requirement whatsoever for flow slots through the plunger itself, nor is there need for a sleeve at the coil core as normally associated with many conventional solenoid operated valve assemblies. In addition, substantially zero non-working air gap is provided for the ferromagnetic circuit when the coil 14 is energized as schematically represented in FIG. 6 wherein the magnetic flux is denoted by lines 120 and will be understood to be a doughnut shaped or toroidal flux path.

In summary, the disclosed valve assembly 10 is of a construction which not only is inexpensive to manufacture but the concentric arrangement of the parts simplifies the construction and additionally reduces the manufacturing costs while providing a symmetrical arrangement and a symmetrical magnetic force which when exerted on the plunger is substantially self-centering. Moreover, the improved efficiency of the ferromagnetic circuit without non-metallic sleeves within the core of the coil 14 and the minimum air gap exhibited by the disclosed construction permits the plunger 76 to be located more remotely to the geometric center of the coil where the maximum flux density exists, thereby achieving the seemingly incompatible aims of improved performance in a low cost valve wherein the plunger is remotely spaced from its electromagnet operating coil.

As will be apparent to persons skilled in the art, various modifications, adaptations and variations of the foregoing specific disclosure can be made without departing from the teachings of this invention.

I claim:

1. A fluid control valve assembly comprising a body having a flow passageway and an inlet port and outlet port opening into the flow passageway, a flow control plunger movable in the flow passageway between first and second positions for controlling fluid flow between the ports, an electromagnet supported on the body, the electromagnet including a solenoid coil and a magnetic flux conducting core having a center leg, the coil being in concentric surrounding relation to the core center leg, the core center leg projecting axially beyond the coil toward the body and having an inner end located in remotely spaced relation to the coil, and a coil supporting member concentrically secured around the inner end of the core center leg, the coil supporting member and the core center leg being mutually deformed in a cold formed metal-to-metal sealed joint to prevent unintended leakage of the confined fluid under pressure, the plunger being mounted for reciprocable movement along a path of movement coaxially aligned with the center leg of the core, the inner end of the core center leg serving as a fixed stop limiting plunger movement toward the coil and establishing one of said first and second plunger positions.

2. The valve assembly of claim 1 wherein the electromagnet includes a cup-shaped magnetic flux conducting housing having an open end defined by a sidewall of the housing, wherein a coil supporting member is concentrically mounted on the inner end of the core center leg, wherein a magnetic flux conducting plate is interposed between the coil supporting member and the valve body in surrounding relation to the plunger, and wherein the housing surrounds the coil and the coil supporting member with the sidewall of the housing adjacent the outer periphery of the flux plate to provide a toroidal magnetic flux path with minimum non-functioning air gap during energization of the solenoid coil.

3. The valve assembly of claim 1 wherein the housing includes a sidewall having an opening therein, wherein the coil includes a bobbin having a depending flange and an apertured boss extending radially outwardly from the flange, the boss being insertable into the housing sidewall opening with the flange in lapping overlying relation to an interior surface of the housing sidewall adjacent its opening, the flange serving as a self-locating device for the coil relative to the housing, coil having lead wires insertable through the opening in the boss to provide lead wire strain relief and exit protection through the housing.

4. The valve assembly of claim 1 wherein a coil supporting member is mounted on the inner end of the core center leg, the coil supporting member and the inner end of the core center leg and the valve body jointly defining a valve chamber in the flow passageway for receiving the plunger.

5. The valve assembly of claim 4 wherein a valve seat is disposed in the valve chamber, the plunger being mounted in the valve chamber for reciprocable movement between said first and second plunger positions toward and away from the valve seat for controlling fluid flow through the flow passageway, and wherein spring means is provided for urging the plunger toward one of said first and second plunger positions, the solenoid coil upon being energized effecting movement of the plunger into the other of its positions.

6. A valve assembly comprising a valve body, an electromagnet supported on the valve body and including a solenoid coil, a housing for the coil, the housing including a sidewall having an opening therein, the coil including a bobbin having a depending flange and an apertured boss extending radially outwardly from the flange, the boss being insertable through the housing sidewall opening with the flange being in lapping overlying relation to an interior surface of the housing sidewall adjacent its opening, the flange of the bobbin serving as a self-locating device for the coil relative to the housing, the coil having lead wires insertable through the opening in the boss to provide lead wire strain relief and exit protection through the housing.

7. The valve assembly of claim 6 wherein the flange of the bobbin includes reinforcing shoulders radially extending in opposite directions for engagement with said interior surface of the housing sidewall adjacent its opening to resist undesired outward movement of the flange.

* * * * *